United States Patent
Schmertz

[11] Patent Number: 6,120,037
[45] Date of Patent: Sep. 19, 2000

[54] AMPLIFIED PRESSURE FORCE SEAL

[76] Inventor: John C. Schmertz, 468 Biddle Ave., Pittsburgh, Pa. 15221

[21] Appl. No.: 09/075,636

[22] Filed: May 11, 1998

Related U.S. Application Data

[60] Provisional application No. 60/047,141, May 20, 1997.

[51] Int. Cl.[7] .................................................. F16J 15/02
[52] U.S. Cl. .......................................... 277/647; 277/654
[58] Field of Search ................................... 277/604, 628, 277/644, 647, 654, 626, 650

[56] References Cited

U.S. PATENT DOCUMENTS

| | | |
|---|---|---|
| 2,303,114 | 11/1942 | Egger . |
| 3,147,015 | 9/1964 | Hanback . |
| 3,217,922 | 11/1965 | Glassgow . |
| 3,490,777 | 1/1970 | Emmerson . |
| 3,879,043 | 4/1975 | Tozer ........................................ 277/647 |
| 4,477,057 | 10/1984 | Friess ..................................... 277/644 X |
| 4,813,692 | 3/1989 | Halling et al. . |
| 4,850,521 | 7/1989 | Servant . |
| 4,854,600 | 8/1989 | Halling et al. . |
| 5,125,796 | 6/1992 | Cromer ................................. 277/644 X |
| 5,240,263 | 8/1993 | Nicholson . |
| 5,630,593 | 5/1997 | Swensen et al. ..................... 277/647 X |

*Primary Examiner*—Anthony Knight
*Assistant Examiner*—Karlena D. Schwing
*Attorney, Agent, or Firm*—Carothers & Carothers

[57] ABSTRACT

A resilient static seal for sealing the closure on a pressure vessel. The seal is provided with a curved cross section with the convex side of the curve exposed to the higher pressure which may exist within the interior or exterior of the pressure vessel. The seal is also provided with opposed inwardly curved side edges which engage the side walls and a bottom wall of a vessel closure seal groove in which the continuous seal is seated.

7 Claims, 11 Drawing Sheets

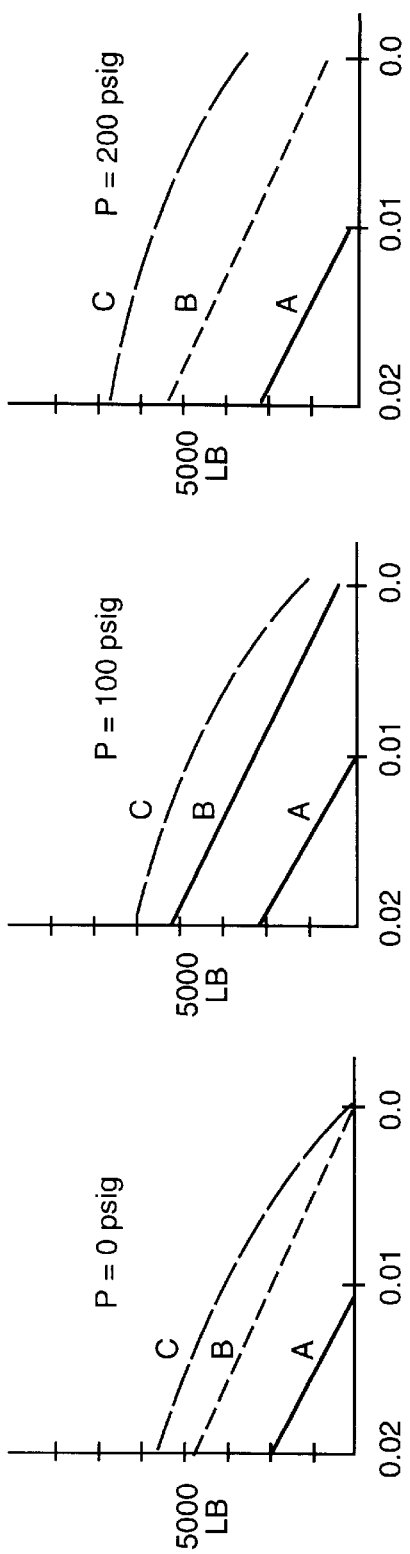
FIG. 8A
FIG. 8B
FIG. 8C
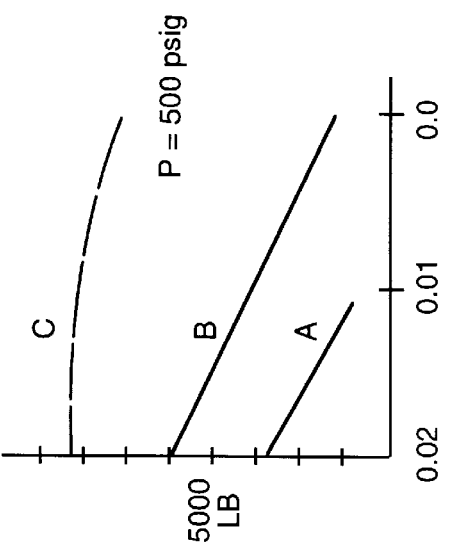
FIG. 8D
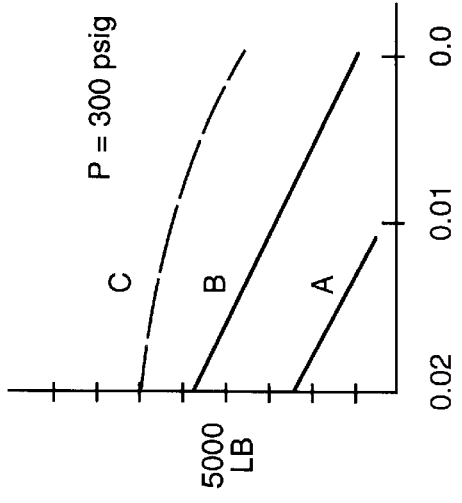
FIG. 8E

AMPLIFIED PRESSURE FORCE SEAL

This application claims benefit of Provisional Appl. 60/047,141 filed May 20, 1997.

FIELD OF THE INVENTION

This invention relates to those static seals which are designed to seal over a wide range of deflection of the vessel flanges. The effectiveness of the sealing depends on the force that the seal exerts on the flanges, which force is sometimes referred to as the "squeezing force". Seals which can maintain the highest squeezing force over the widest range of flange deflection are the most effective in sealing.

BACKGROUND OF THE INVENTION

Static seals currently available which operate over a wide range of flange deflection are of two categories. These categories are the "E-seal" category, and the inflatable seal category.

The E-seals are only short bellows. Most of their squeezing force comes from compressing them as springs. The remainder of the squeezing force comes from the pressure of the sealed fluid, acting upon the end corrugations of the bellows. The total squeezing force is not large, since a bellows is basically a flexible container, rather than a seal. Another limitation of E-seals is that they must generally be circular in the plane view, since E-seals are not so easily formed into other shapes, either in a plane or out of a plane.

The inflatable seals are hoses filled with air under pressure. Before they are pressurized, these hoses have oval cross-sections. Under pressure, the hoses try to become circular in cross-section, and in the process, they push against the vessel flanges to provide the squeezing force needed for sealing. Inflatable seals require a reliable air supply system, including a tank or compressor to supply the air, as well as means for regulating the hose pressure.

Inflatable seals are typically made of low strength materials, such as rubber, or rubber-like materials, so they are only suitable for the lower working pressure applications. (They are sometimes used to maintain cabin pressure in aircraft). Because of their material, they cannot be used at high temperatures. They become somewhat brittle at very low temperatures. E-seals, which are typically metallic, are suitable for high working-pressures, high temperatures, and low temperatures. However, the E-seals generally cannot accommodate as wide a range of flange deflection as can the inflatable seal. For the very high working pressures, "C-ring" seals, "O-ring" seals, and many other types of seal can be used. Unfortunately seals which are good for the very high working pressures are not so acceptable for applications where there is a wide range of deflection of the vessel flanges.

There are a wide variety of static seals available, each type being the best currently available choice for one challenge or another. Because of these many different challenges, there will always be a need for improved static seal designs.

It is a primary object of the present invention to provide seals for applications where there is a wide range of deflection of the vessel flanges, and where the squeezing force (or force for sealing) is much larger than can be obtained from other seals with large deflection capability.

Another object of the present invention is to provide low pressure seals with a capability for good sealing over wide ranges of flange deflection, combined with the capability to provide a squeezing force comparable to the inflatable seals, but which does not require any provisions for its own air supply.

Yet another object of the present invention is to provide a good low pressure seal, (metallic or of other material) with a wide range of deflection, which is not necessarily circular in its plan view, but which can be readily formed, because it has a cross-section of simple geometry which does not have deep corrugations, into any general shape either in or out of a plane.

It is a general object of this invention to improve static seal technology.

SUMMARY OF THE INVENTION

These and other objects are embodied by a static seal of the present invention which has a thin cross-section which is convex to the higher pressure fluid, and which, like some other types of static seals, is prevented from moving either away from or toward the interior of a pressure vessel (depending on whether the higher pressure is inside or outside the pressure vessel) by a wall of the recess in which the seal is seated. The seal is further provided with inwardly curved side edges (curved toward the concave face of the seal) whereby exterior surfaces thereof engage the bottom wall of the top closure flange, side walls and a bottom wall of the vessel closure seal groove seat. By virtue of the gentle convexity of the convex side of the seal, the force applied to the side of the seal by the higher pressure fluid causes a squeezing force against the flanges at the exterior surfaces of the inwardly curved side edges of the sealing surfaces of the seal. It is realized that the amount of this squeezing force is greatest for those seals where the distance between the sealing surfaces of the seal is greatest.

These and other objects are also realized by a static seal shaped in such a manner that the stressing of the seal material of itself provides a high squeezing force over a wide range of compression.

These and other objects are also realized by a seal which provides a squeezing force due to the effect of the higher pressure fluid as it acts upon the convex curved shape, in addition to the effect of the stressing of the seal material when the seal is compressed.

In a second embodiment, this static seal invention also includes a plurality of nested rings with cross-sections convex to the higher pressure fluid, whose curved walls everywhere abut to one another, such that their wall surfaces are in surface-to-surface laminated contact, but free to slide. These nested rings (or plies) are similar in shape, but not identical, because they must fit one within the other.

The object of this second embodiment is to strengthen the seal, by lowering the stresses due to the higher pressure fluid, while at the same time not allowing excessive bending stresses when the seal is compressed at installation. (If one thick ring were used instead of a plurality of thinner rings adding up to the same thickness, the bending stresses would be prohibitive when the seal is compressed).

Another objective of the second embodiment is to increase the squeezing force (or force for sealing) as the number of nested rings increases.

In a third embodiment the invention includes a rubber like non-metallic material which can be extruded to provide variation in wall thickness, and which behaves in a similar fashion as the other embodiments. Owing to its very large deflection capability, it is offered as an alternative for inflatable seals, having the distinct advantage in that it does not require its own air supply.

BRIEF DESCRIPTION OF THE DRAWINGS

A full understanding of the invention can be gained from the following description when read in conjunction with the accompanying drawings in which:

FIGS. 8A through 8E are graphic representations which compare squeezing force vs. compression for two E-seals (cases 'A' and 'B') and the example invented seal (case 'C'), at pressures of 0 psig, 100 psig, 200 psig, 300 psig, and 500 psig.

DESCRIPTION OF THE PREFERRED EMBODIMENTS

Figure 1A:
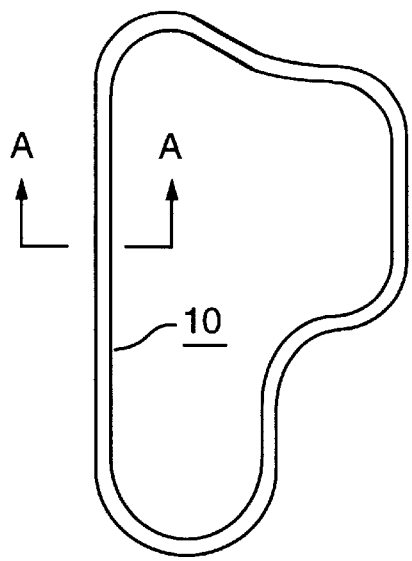
FIG. 1A shows a generalized plan view of one embodiment of the static seal of the present invention.
Figure 1C:
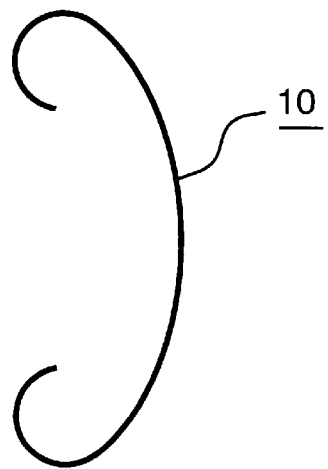
FIG. 1C is a view in cross-section of the seal shown in FIGS. 1A and 1B as seen along section line A—A.
Figure 1B:
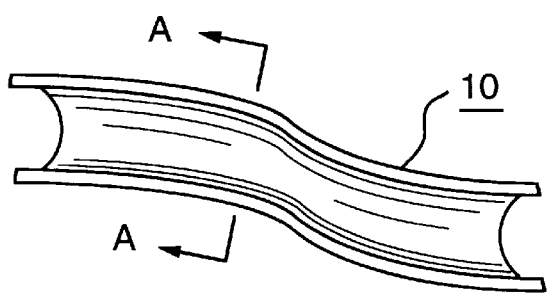
FIG. 1B is a perspective view of a segment of the seal shown in FIG. 1A.

The invented seal 10 can be of any general annular shape in the plan view, as illustrated in FIG. 1A. A typical cross-section of the seal is shown in Section A—A in FIG. 1C.

Figure 2:
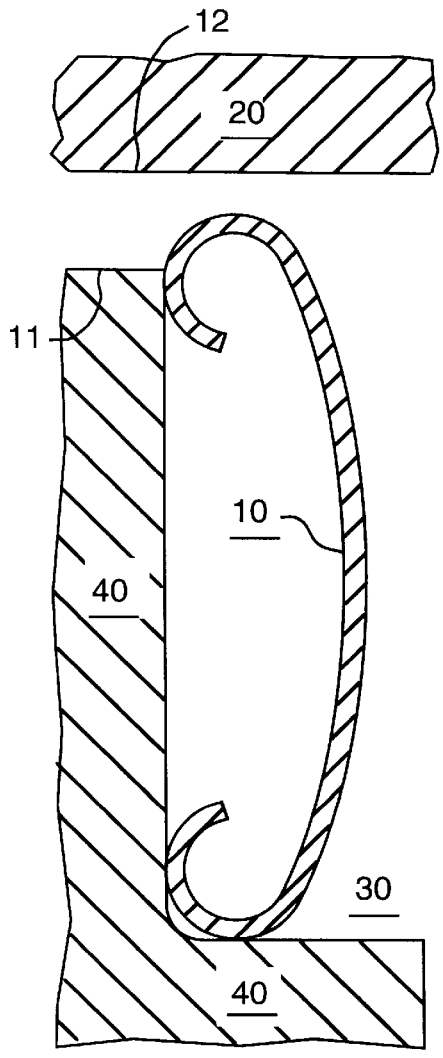
FIG. 2 is a view in vertical cross-section which shows a face seal embodiment of the static seal of FIGS. 1A, 1B and 1C at installation, when the vessel flanges are separated. It is understood that the convex cross-section points toward the higher pressure fluid.

The static seal 10, in its "face seal" embodiment, is shown in FIG. 2. It is seated in a counterbore or recess 30 which is machined in a lower flange 40. The seal 10 is initially installed and the flanges 20 and 40 are still separated. Surfaces 11 and 12 have not yet touched.

Figure 3:
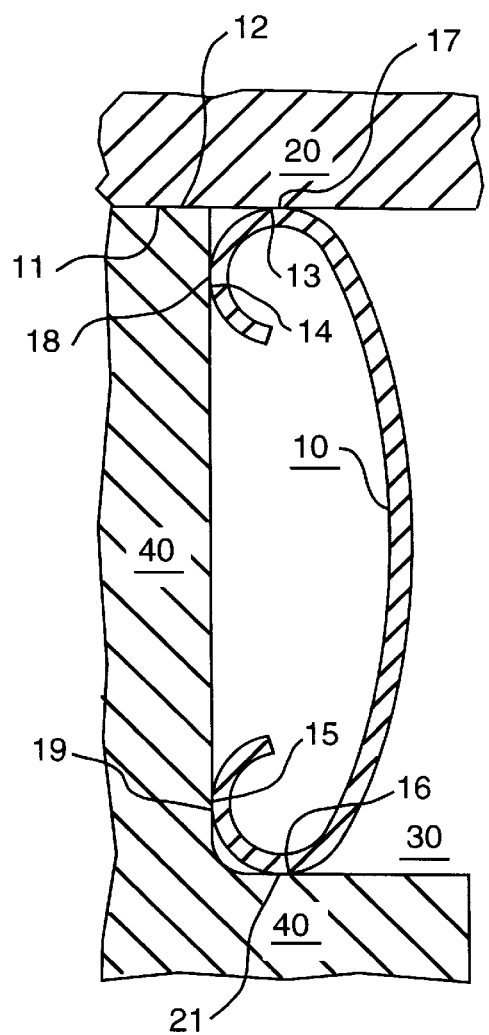
FIG. 3 shows the static seal of FIG. 2 when the flanges are closed, the seal is thereby preloaded, and the seal and vessel have not yet been subjected to any pressure.

FIG. 3 shows the assembly 10, 20, and 40 before pressurization, with surfaces 11 and 12 just touching. The seal is now squeezed between the flanges 20 and 40. The seal contact areas 13, 14, 15, and 16 press against their corresponding contact areas 17, 18, 19, and 20 of the vessel flanges. The force between 13 and 17, and between 16 and 21 is the squeezing force available when there is little or no pressure in the vessel. It is the first portion of the squeezing force.

Figure 4:
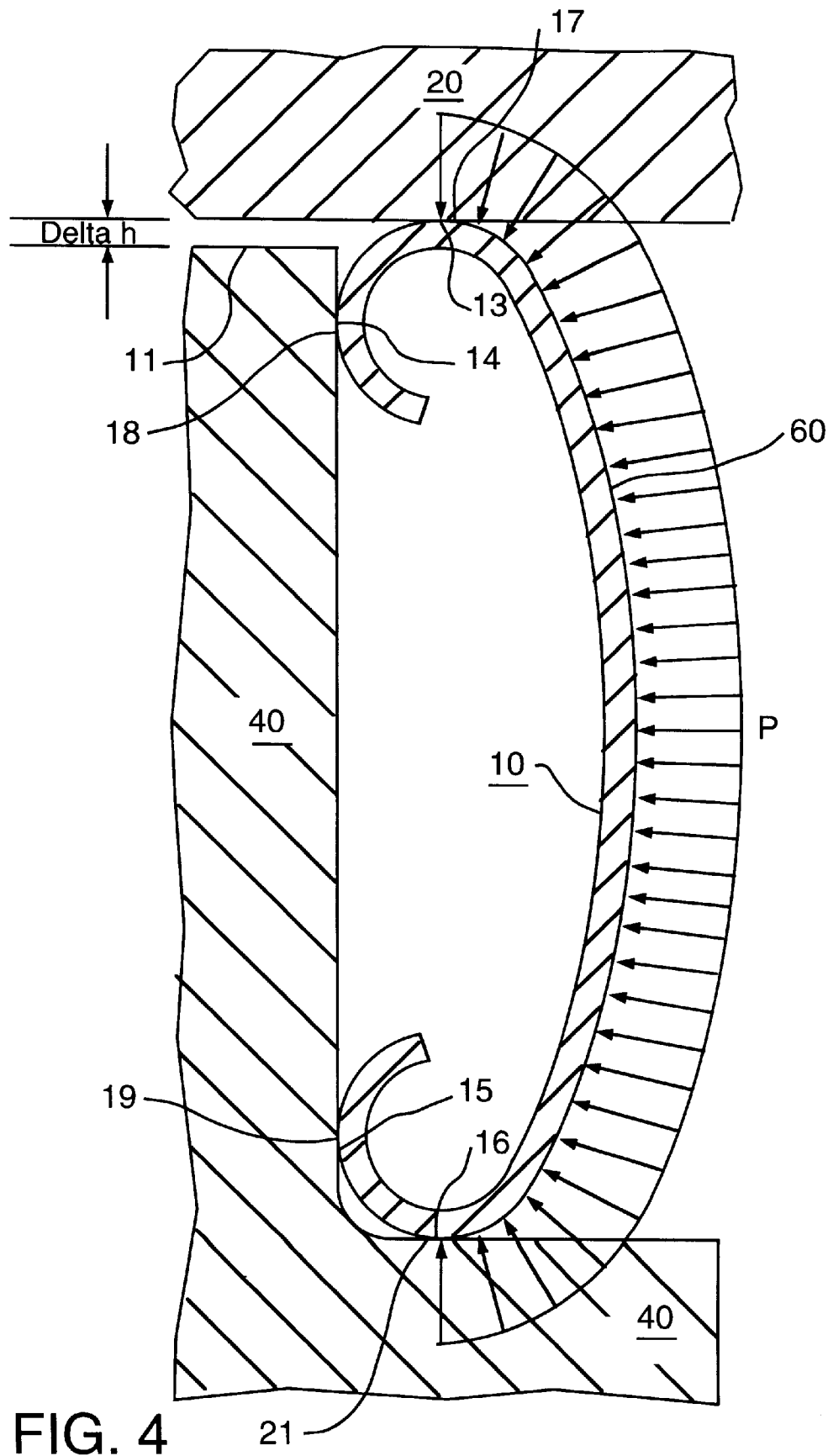
FIG. 4 shows the static seal of FIGS. 2 and 3 after pressurization with the flanges slightly separated.

After pressurization, the seal will appear as shown in FIG. 4. The sealed fluid presses with a pressure "P" on the convex seal wall 60 of the seal 10 so as to push the areas 14 and 15 against the corresponding lower flange areas 18 and 19. Because of the seal's gentle convex geometry, this generates a squeezing force at the areas 13 and 16 of the seal 10 against the areas 17 and 21 of the vessel flanges 20 and 40.

By this arrangement, the force from the vessel pressure 'P' acting laterally against the convex seal wall 60 can be said to be redirected or "amplified" to contribute a second part to the seal's total squeezing force.

The gap "delta h" between the surfaces 11 and 12 (see FIG. 4) represents the deflection when the vessel pressure tends to separate the flanges by stretching the flange bolts and thereby distorting the vessel locally. The larger this "delta h" becomes, the smaller becomes the squeezing force available from the mechanical resilience of the seal. It is a primary objective of any seal (including this invention) to maintain high squeezing loads for large and small "delta h" values. In the case of the invented seal, the high total squeezing force, over a wide range of deflection, is maintained by virtue of its amplified pressure component.

To match the deflection capability of currently available E-seals, the invented seal must be slender, to avoid over stressing in bending when the seal is compressed. The slenderness points to a low working pressure for the invented seal. However, thanks to the invented seal's special convex curve, and the forces at areas 18 and 19 which support the seal, the pressure stresses in the seal are lower than one might expect from looking at FIGS. 1 through 4. Finite element calculations show this. The invented seal shown in FIGS. 1 through 4 is the practical choice over the E-seals for the lower working pressure applications.

Figure 5:
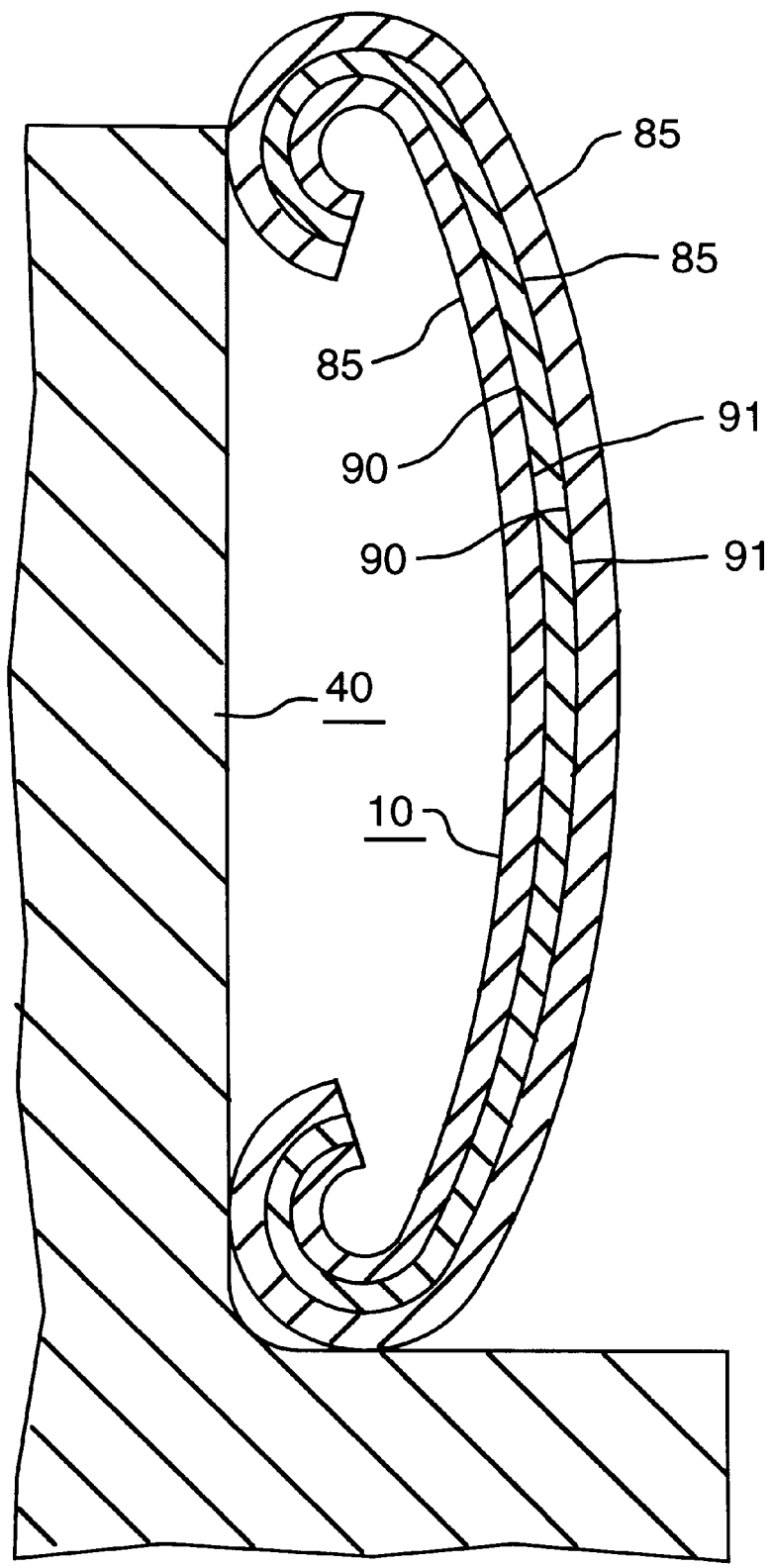
FIG. 5 is a vertical cross-section view which shows another embodiment of the static seal with a plurality of nested rings whose walls are in surface-to-surface contact.

Another embodiment of the invention has the same large deflection capability and the same reasonable bending stress levels as the embodiment shown in FIGS. 1 through 4, but with a higher working pressure capability and a higher squeezing force. This embodiment is shown in FIG. 5. The nested rings 85, which can slide at the mating surfaces 90 and 91, increase the strength and the squeezing force of the invented seal without increasing the bending stresses when the seal is compressed. Such nested rings or "plies" are already found in other seal designs for the purpose of reducing bending stress.

Figure 6:
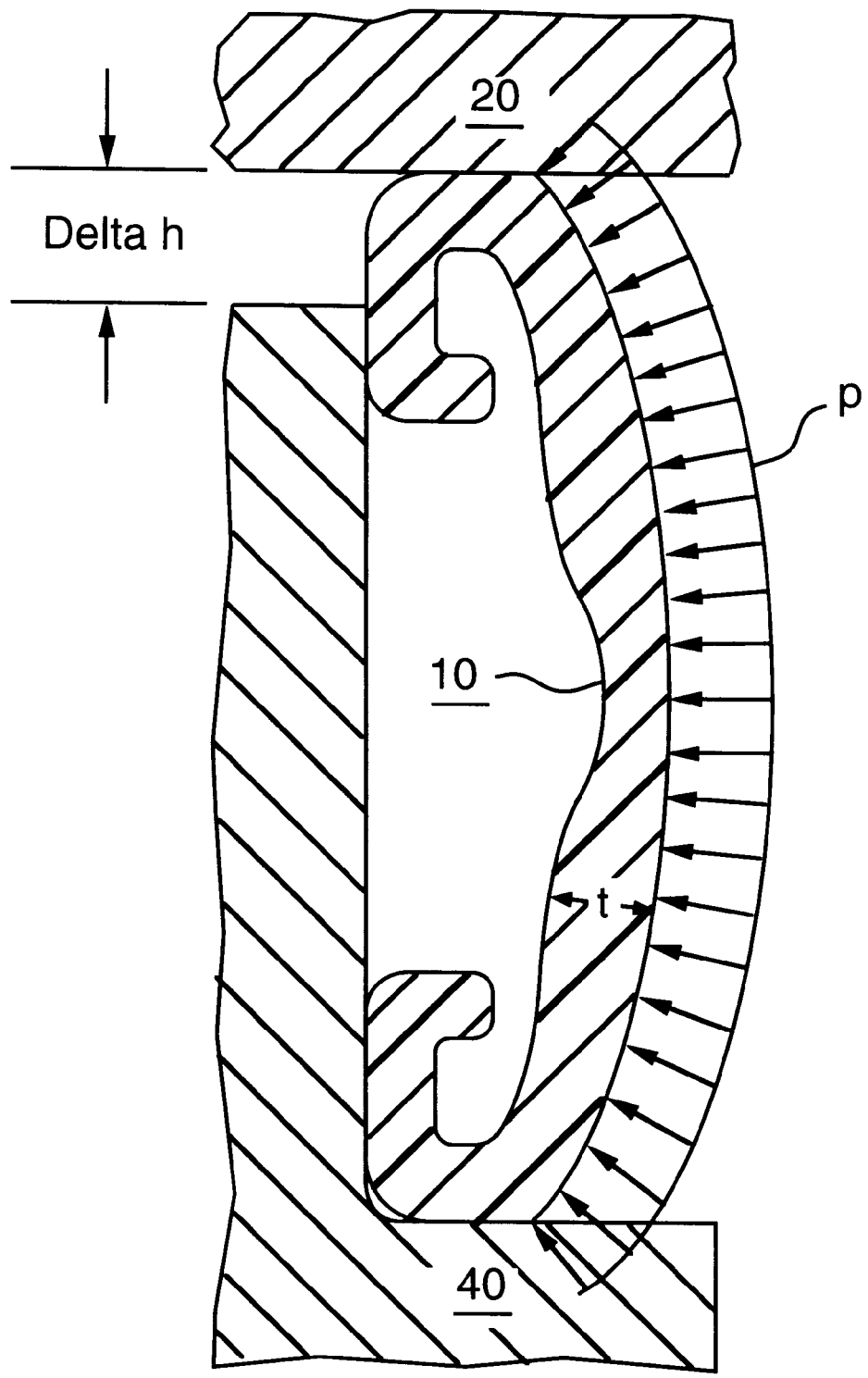
FIG. 6 is a view in vertical cross-section which shows an embodiment with a generalized cross-section for an extruded shape, such as would be especially easy to achieve if the seal were to be made of plastic or rubber.

Another embodiment of the invention is shown in FIG. 6. This embodiment would be made of rubber or a rubber like non-metallic material. Since the material would be extruded to make the seal, the thickness 't' need not be constant. It would vary in some way to optimize the design. This is the embodiment which would compete with the inflatable seals.

From the above discussion of various embodiments, it can be appreciated that the invented seal lends itself to a wide variation of the many parameters available to it, so that it can be adjusted to meet the special requirements demanded by various static sealing applications.

Figure 7:
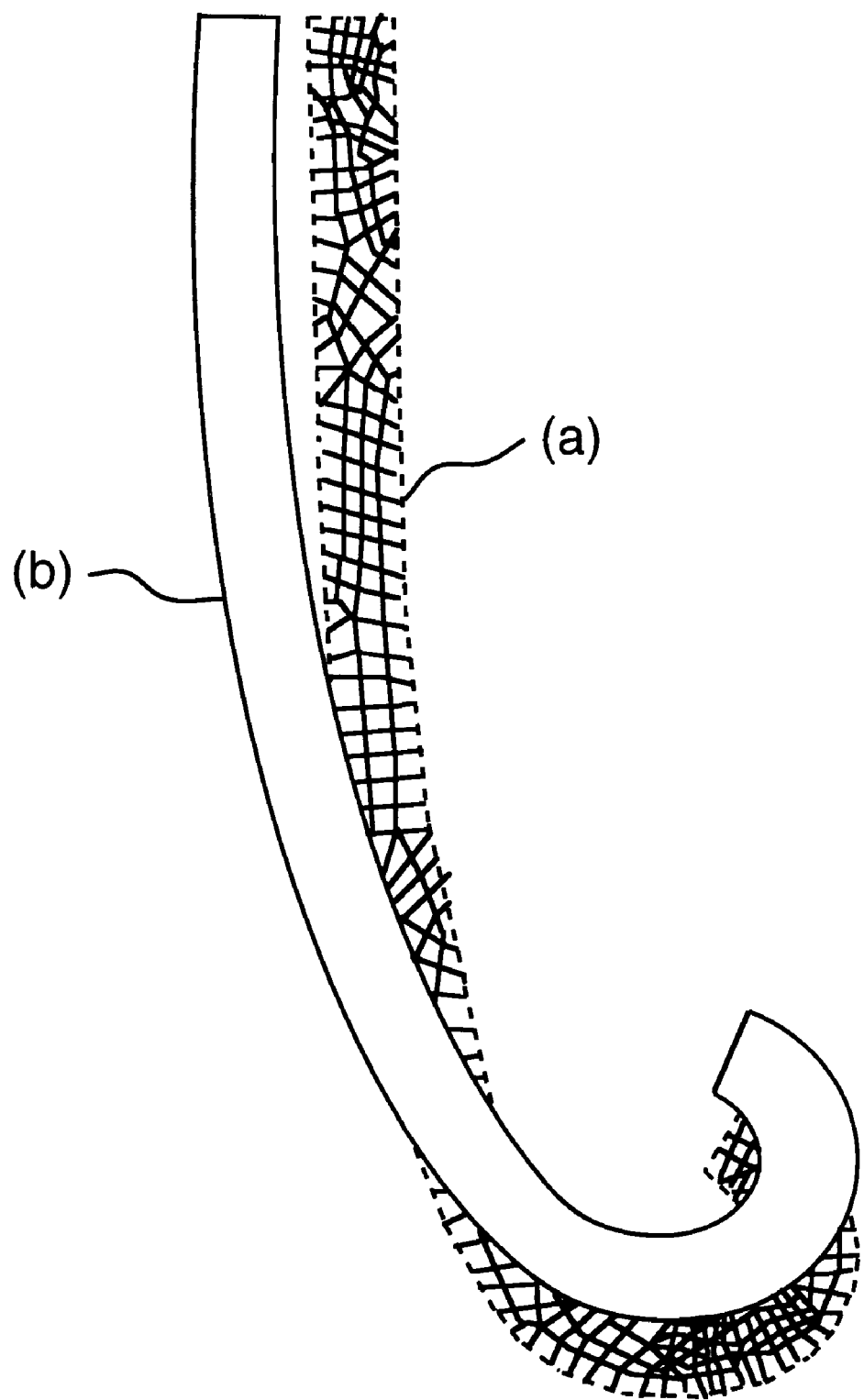
FIG. 7 is a diagrammatic view which shows two views of a finite element model of an example of the invented seal. The figure shows only the lower half of the cross-section. The view showing the finite elements is the unstressed shape of the invented seal. The view which appears as a solid shape shows the position of the invented seal after installation, but before pressurization. The convexity points radially inward in this case, since an axisymmetric vessel with the higher pressure on the inside was modeled.

With the understanding that the invention has a very broad scope, and can take many shapes or forms, a specific example was selected for numerical analysis. The selected example is an internal pressure face seal. The seal is a 20" diameter circular ring, which has a standard 0.01" thickness of material. (The ring is single ply). Seated in a counterbore or seal recess seat, it is somewhat more than 5/16" high and 1/16" wide. The assumed material for the example seal is Inconel 718, which is one of the high strength materials used by the E-seal manufacturers. FIG. 7 shows a finite element model of the lower half of the seal cross-section. Two views are shown: a) uncompressed after installation, and b) fully compressed by the flange, before the vessel is pressurized.

Finite element stress analysis, using a non-linear, elastic, large deflection analysis option, was carried out to evaluate the performance of this example face seal when it is subjected to the following load conditions:

a) Pressure only (up to 500 psig), without deflection.

b) Deflection only (up to 0.02"), without pressure.

c) Application of 0.02" deflection as a first load step, to represent preloading, followed by a second load step which adds 100 psig internal pressure. The 0.02' deflection is not changed. This load condition represents the case where the flange connection is so stiff that the internal 100 psig pressure has no significant effect on separating the flanges, while it does stress the seal and it does add to the squeezing force.

d) Without changing the 100 psig pressure, reduce the seal deflection from 0.020" to 0.015", 0.010", 0.005", and 0.0". The diminishing deflections correspond to various flange designs which are less and less stiff. For example, a flange design which allows movement from 0.02" to 0.005", under a 100 psig internal pressure necessitates choosing a face seal with wide deflection capability. These conditions represent the cases where the flange connections are not so stiff, such that the 100 psig pressure does have a significant effect on separating the flanges as it stresses the seal.

e) Application of steps (c) and (d) for higher pressures ranging up to 500 psig.

Steps (a) and (b) were used to optimize the shape of the cross-section for this example seal by trial and error. The final shape arrived at was always a convex curve without inflection points. This shape gave the highest squeezing force result, without exceeding the ASME BPVC stress allowables required for fully elastic operation of the face seal during installation and operation.

To quantify stress limitations for the example of the invented seal, the inventor performed finite element stress analysis on currently manufactured E-ring seals, to find out what stresses their manufacturers allowed for them. These E-seals were of Inconel 718, and their dimensions, maximum working pressures, and maximum deflections were all taken from a manufacturer's catalog. Stress profiles calculated for the manufactured E-ring seals using the highest loadings advertised, were then used as allowable upper bound stress profiles for the invented seal example. The stress allowables so obtained led to a maximum allowed internal pressure for the example invented seal of 500 psig, and an allowed combination of a maximum internal pressure of 500 psig, combined with a 0.02" deflection at preloading.

Steps c, d, and e were used to generate the curved lines 'C' shown in FIGS. 8A through 8E for the example of the invented seal. In the figures, the ordinates are the amount of the squeezing force, and the numbers below the abscissas are the amount the seal has been compressed by the flanges. As would be expected, the highest squeezing forces occur when the seals are compressed the most. Also as expected, the squeezing forces increase with the internal pressure. The other lines 'A' and 'B' in the figure, which are all straight lines, are for typical 1/16" and 1/8" E-seals. These lines 'A' and 'B' are generated based on E-seal data extracted from a manufacturer's catalog. The 1/16" seal (lines 'A') is the worst performer, followed by the 1/8" seal (lines 'B'); and the best performer is the invented seal (lines 'C').

FIGS. 9A, 9B, 9C and 9D all show the same hypothetical flange assembly, except for the counterbores used for the face seals.

Figure 9A:
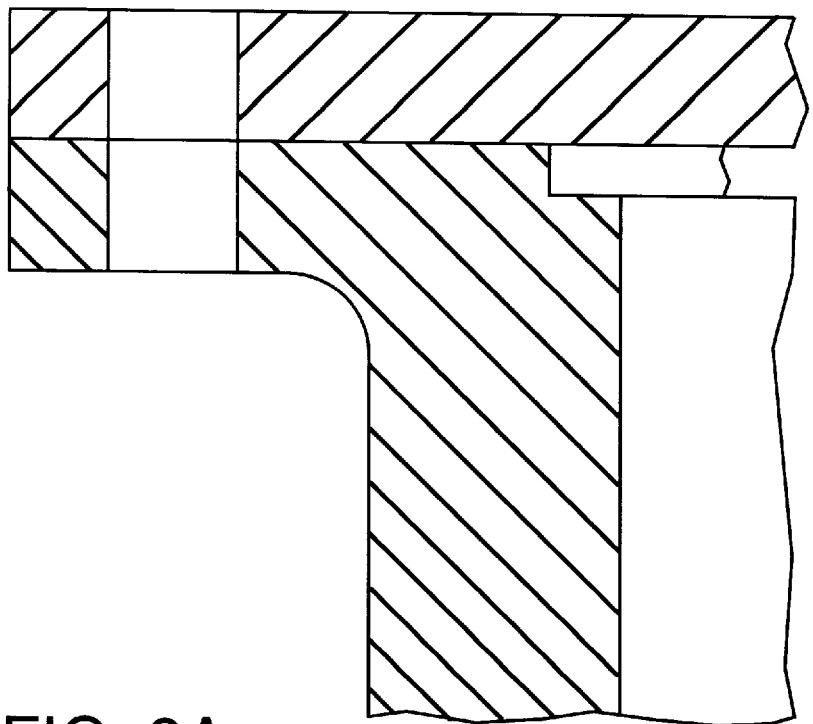
FIG. 9A is a view in vertical cross-section which shows a flange assembly which has been counterbored for a nominal 1/16" E-seal (case A).
Figure 9B:
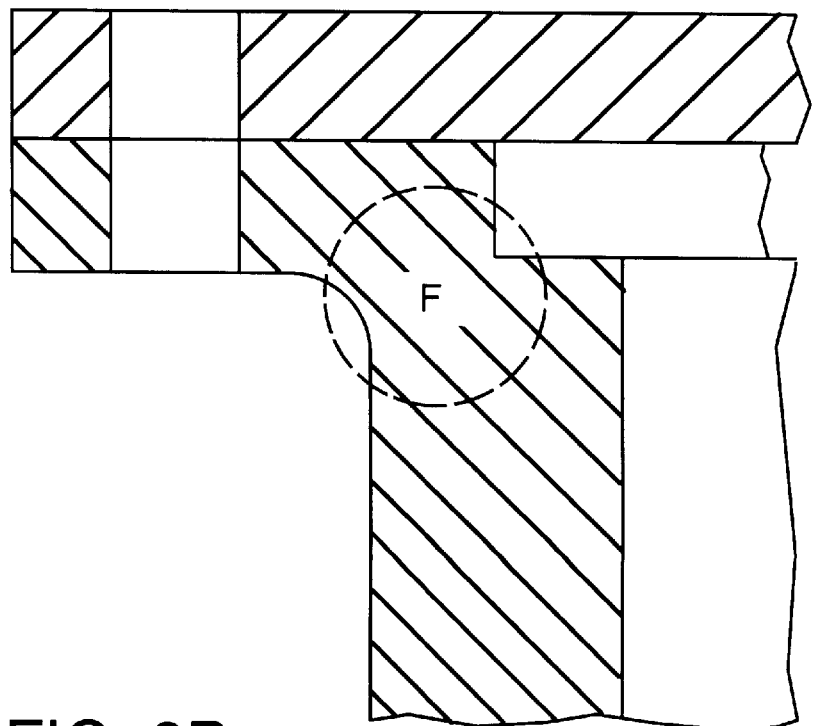
FIG. 9B is a view in vertical cross-section which shows the same flange assembly which has been counterbored for a nominal 1/8" E-seal (case B).
Figure 9C:
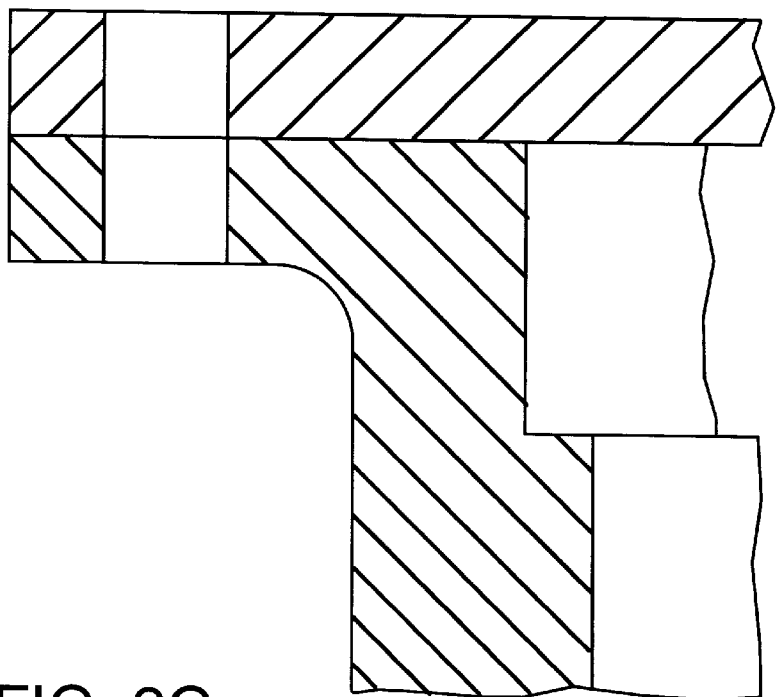
FIG. 9C is a view in vertical cross-section which shows the same flange assembly which has a counterbore such that it has the width a counterbore for a 1/16" nominal E-seal (case A), but the depth of a counterbore needed for the example invented seal (case C).

Suppose there is a 1/16" E-seal seated in the counterbore which is shown in FIG. 9A. Suppose also that it leaks so much that a different seal should be considered. Examining FIGS. 8A through 8E indicates that the 1/8" nominal E-seal (which is the next largest size) would be a huge improvement. To replace the 1/16" E-seal by a 1/8" E-seal would require the counterbore to be enlarged, as shown in FIG. 9B. This enlargement, however, might not be acceptable, because it removes so much metal. Only the metal surrounded by circle 'F' would remain. Although the local hoop stress at 'F' is probably acceptable, because of support by the lower flange, the local axial stress could be too high. Another look at FIGS. 8A through 8E shows that the invented seal (lines 'C') would be the best improvement (provided that the working pressure is 500 psig or less). To replace the 1/16" E-seal by the invented seal, it would not be necessary to increase the width of the counterbore. Its depth, however, would need to be much deeper, as shown in FIG. 9C. This enlargement looks acceptable from the stress standpoint. (The average axial stress at the counterbore would not even be doubled, which makes it less than the average hoop stress for a uniform cylinder. As with the FIG. 9B case, the local hoop stress would again be acceptable because of support from the lower flange).

Figure 9D:
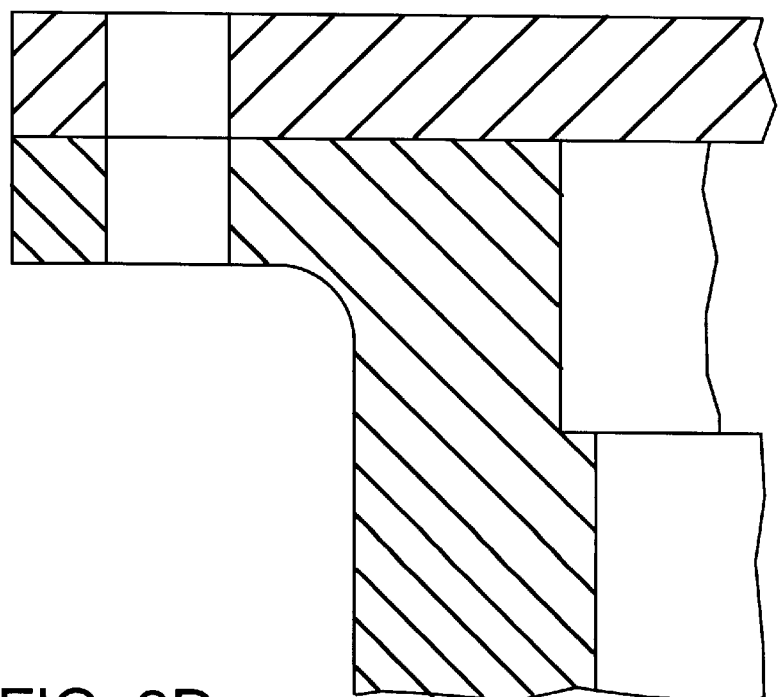
FIG. 9D is a view in vertical cross-section which shows the same flange assembly counterbored with just enough width to support the example invented seal, and with the same counterbore depth as in FIG. 9C.

FIG. 9D represents the same flange assembly as it would be if it were initially machined for the invented face seal. With this last version, even more of the flange is left intact.

Because there are so many applications where the working pressures are less than 500 psig, the specific example given above is enough to demonstrate the general usefulness of this invented seal for the lower to medium working pressure applications.

For working pressures higher than 500 psig, the nested ring embodiment shown in FIG. 5 suggests itself. A nested ring embodiment could be used in place of the example seal analyzed above. It would not only allow working pressures higher than 500 psig, but it would also exert a higher squeezing forces before and after pressurization.

Figures 10, 11:
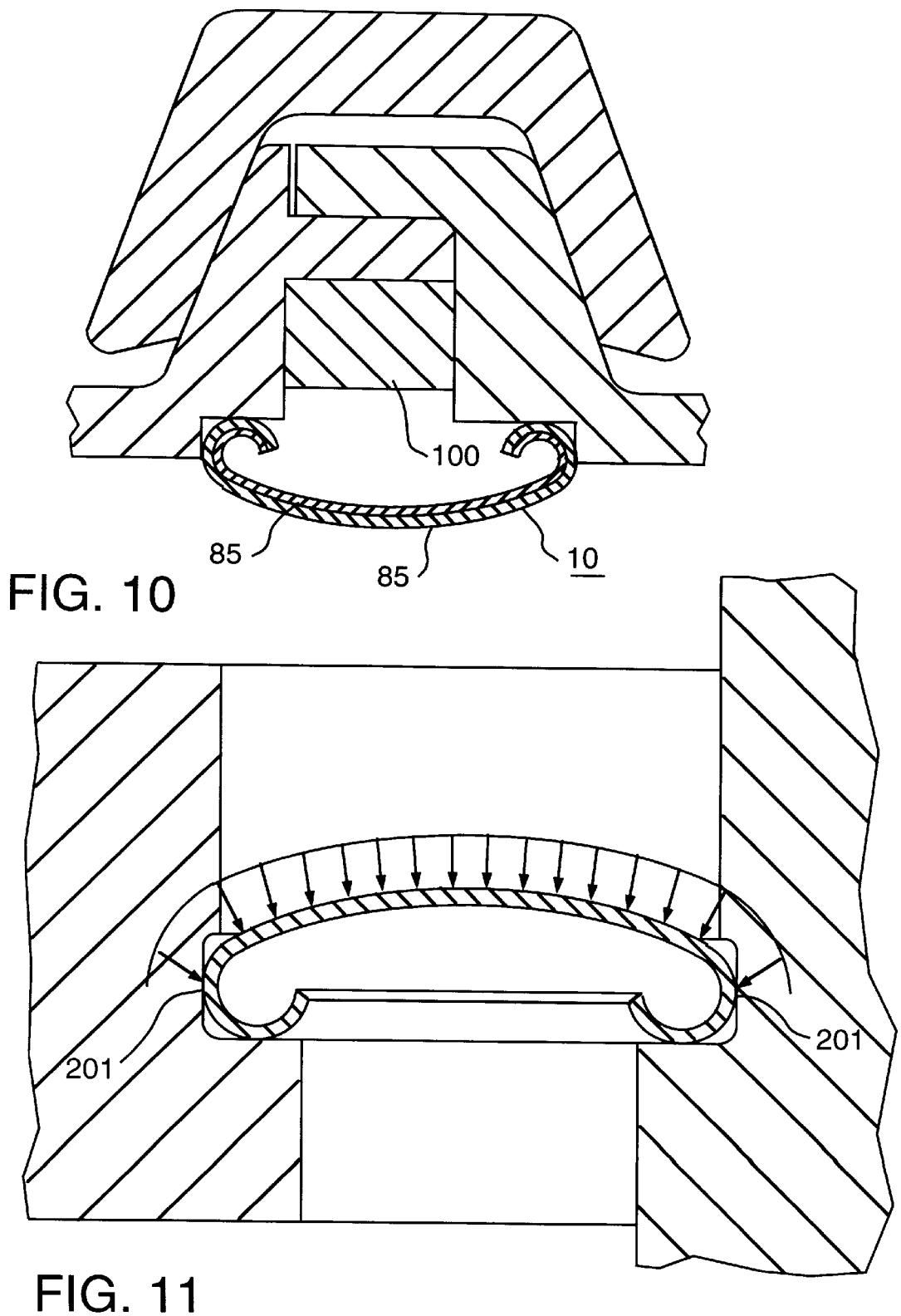
FIG. 10 is a view in horizontal cross-section which shows the invented seal installed in a pipe flange.
FIG. 11 is a view in horizontal cross-section which shows an embodiment of the invented seal wherein the surfaces to be sealed are each parallel to the longitudinal axis of the vessel.

Returning from the specific example analyzed above to the general discussion, FIG. 10 shows how the invented seal 10 might look in place of an E-seal in a pipe flange. Solid ring 100 fills the space formerly occupied by the E-seal.

For low pressures with very large deflection applications, the extruded version shown in FIG. 6 suggests itself.

Figure 12:
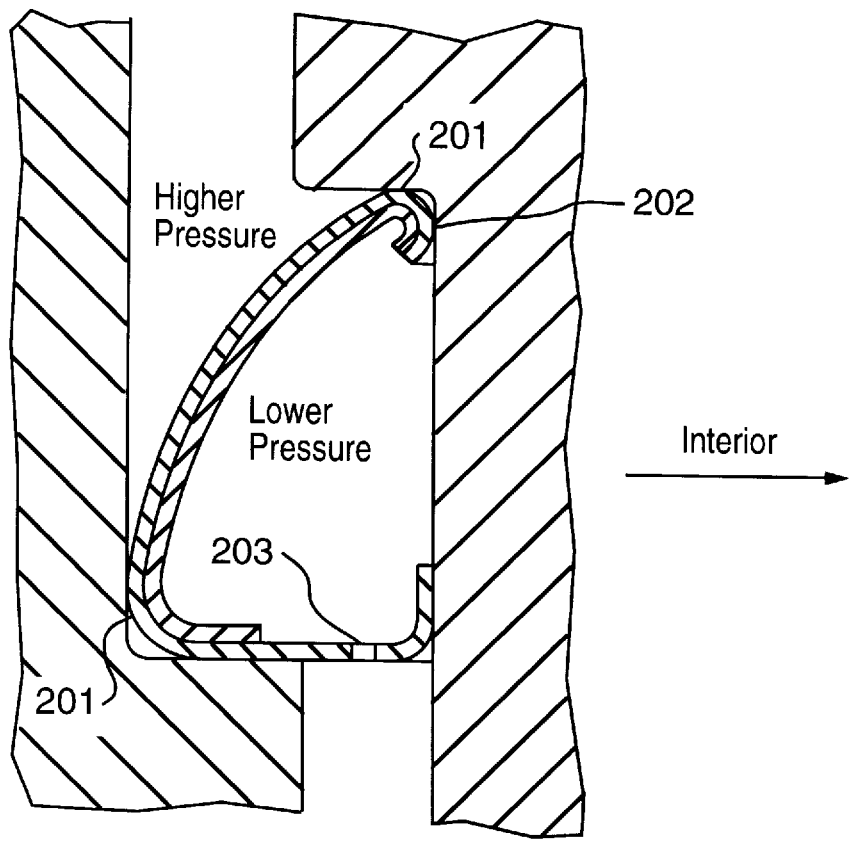
FIG. 12 is a view in vertical cross-section which shows a laminated embodiment of the invented seal wherein that surface to be sealed, which is toward the vessel interior, is perpendicular to the longitudinal axis of the vessel; and where that surface to be sealed, which is toward the vessel exterior, is parallel to the longitudinal axis of the vessel.
Figure 13:
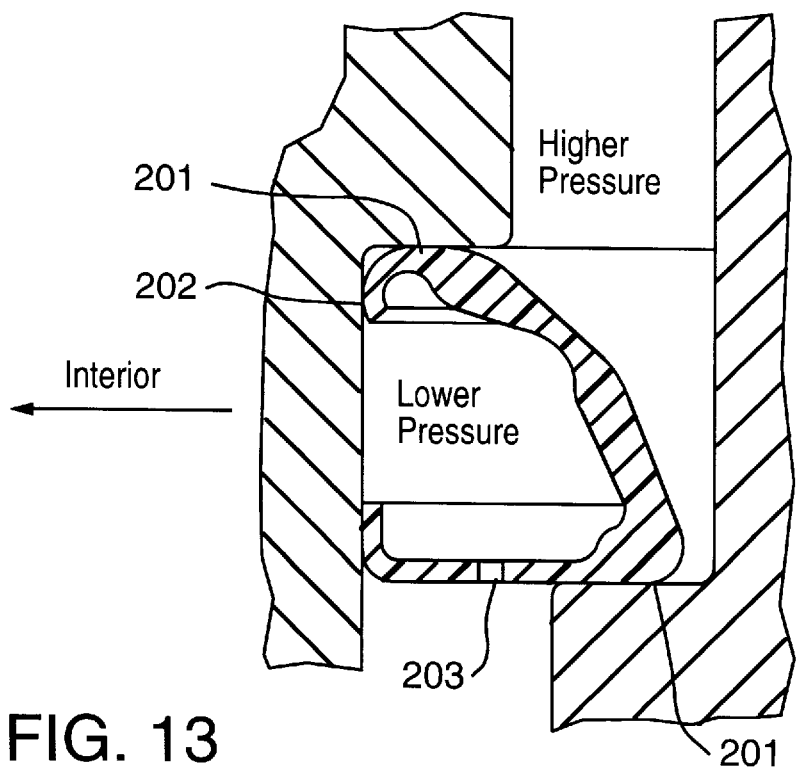
FIG. 13 is a view in vertical cross-section which shows another embodiment which is an extruded version of the invented seal. That surface to be sealed, which is toward the vessel interior, is perpendicular to the longitudinal axis of the vessel; and that surface to be sealed, which is toward the vessel exterior, is also perpendicular to the longitudinal axis of the vessel.

FIGS. 11 through 13 show how the invention can be generalized for adaptation to the cases where the sealing surfaces, such as 201 and 202, are not necessarily parallel to each other, nor are they each perpendicular to the longitudinal axis of the vessel, nor are they directly opposite each other. However, for these generalized versions, as well as the axially compressible versions shown earlier, the cross-section is always curved convex to the higher pressure. Also, the generalized versions of FIGS. 11 through 13 can be of either uniform thickness, or of varying thickness, after the fashion of FIG. 6. Vent holes 203 are provided to allow the concave side of the seal to equalize to the lower pressure.

I claim:

1. A combination pressure vessel with an interior pressure which is different from pressures on its exterior and a resilient static seal for seating in a vessel closure seal groove seat in said vessel said seal having a curved cross-section with a convex face and an opposite concave face with exposure of said convex face to the higher pressures, said seal having at least one side edge curved inwardly toward the concave face of said seal whereby exterior surfaces thereof will engage a side wall and a bottom wall of the vessel closure seal groove seat in which said seal is seated.

2. The resilient static seal of claim 1 wherein said seal is of uniform thickness in cross-section.

3. The resilient static seal of claim 2 wherein the curved cross-section of said seal is without inflection points.

4. The resilient static seal of claim 2 wherein said seal is composed of metal.

5. The resilient static seal of claim 2 wherein said seal is comprised of a plurality of seal segments nested with each other in laminations.

6. The resilient static seal of claim 1 wherein said seal has a cross-section of varying thickness.

7. The resilient static seal of claim 6 wherein said seal is composed of a resilient non-metallic material.

* * * * *